(12) United States Patent
Hsu et al.

(10) Patent No.: US 10,972,963 B2
(45) Date of Patent: Apr. 6, 2021

(54) DETERMINATION AND TRANSMISSION OF BSS LOAD METRICS FOR MU WLAN SYSTEMS

(71) Applicant: MEDIATEK INC., Taiwan (CN)

(72) Inventors: Chien-Fang Hsu, Taiwan (CN); Chao-Chun Wang, Taiwan (CN); Chih-Shi Yee, Taiwan (CN); Gabor Bajko, Santa Clara, CA (US)

(73) Assignee: MEDIATEK INC.

( * ) Notice: Subject to any disclaimer, the term of this patent is extended or adjusted under 35 U.S.C. 154(b) by 0 days.

(21) Appl. No.: 15/648,357

(22) Filed: Jul. 12, 2017

(65) Prior Publication Data

US 2018/0020367 A1    Jan. 18, 2018

Related U.S. Application Data

(60) Provisional application No. 62/361,086, filed on Jul. 12, 2016.

(51) Int. Cl.
*H04B 7/0452* (2017.01)
*H04L 5/00* (2006.01)
(Continued)

(52) U.S. Cl.
CPC .......... *H04W 48/10* (2013.01); *H04B 7/0452* (2013.01); *H04L 5/0092* (2013.01);
(Continued)

(58) Field of Classification Search
CPC ....... H04B 7/028–061; H04B 7/15528–15592; H04B 17/10–101; H04B 17/30–40; H04L 5/0001–26; H04J 11/0023–0093; H04W 8/18–245; H04W 16/02–10; H04W 24/02–10; H04W 28/02–14; H04W 36/06;
(Continued)

(56) References Cited

U.S. PATENT DOCUMENTS

2010/0246538 A1    9/2010  Kravtsov et al.
2013/0301463 A1*  11/2013  Lee ...................... H04W 48/08
                                                        370/252

(Continued)

*Primary Examiner* — Timothy J Weidner

(57) ABSTRACT

Systems and methods of providing Basis Service Set (BSS) load information pertinent to multi-user (MU) communications in WLAN systems. An access point (AP) can determine the counts of MU-capable user stations (STAs) active STAs in a BSS. Each MU-capable STA is configured for Multi-User Multiple-Input Multiple-Output (MU-MIMO) communications and/or Orthogonal Frequency-Division Multiple Access (OFDMA) communications. The AP can further determine ratios of PPDU time over an observation period of MU uplink (UL) and downlink (DL) communications, respectively. The AP can further determine an underutilization level of each available frequency subband, the underutilization level integrating the actual underutilization in terms of both spatial streams and frequency subbands. The DL and UL underutilization levels can be separately determined and reported. The MU BSS load information can be included in a beacon frame as a BSS load information element and distributed to user STAs periodically.

23 Claims, 11 Drawing Sheets

(51) Int. Cl.

| | | |
|---|---|---|
| *H04W 8/24* | (2009.01) | |
| *H04W 24/02* | (2009.01) | |
| *H04W 24/10* | (2009.01) | |
| *H04W 28/02* | (2009.01) | |
| *H04W 48/06* | (2009.01) | |
| *H04W 48/10* | (2009.01) | |
| *H04W 48/12* | (2009.01) | |
| *H04W 48/18* | (2009.01) | |
| *H04W 48/20* | (2009.01) | |
| *H04W 72/04* | (2009.01) | |
| *H04W 72/12* | (2009.01) | |
| *H04W 76/10* | (2018.01) | |
| *H04W 84/12* | (2009.01) | |
| *H04W 88/02* | (2009.01) | |
| *H04W 88/08* | (2009.01) | |
| *H04W 92/10* | (2009.01) | |

(52) U.S. Cl.
CPC ........... *H04W 8/245* (2013.01); *H04W 24/02* (2013.01); *H04W 24/10* (2013.01); *H04W 28/0247* (2013.01); *H04W 48/06* (2013.01); *H04W 48/12* (2013.01); *H04W 48/18* (2013.01); *H04W 48/20* (2013.01); *H04W 72/0486* (2013.01); *H04W 72/1252* (2013.01); *H04W 76/10* (2018.02); *H04W 84/12* (2013.01); *H04W 88/02* (2013.01); *H04W 88/08* (2013.01); *H04W 92/10* (2013.01)

(58) Field of Classification Search
CPC ..... H04W 36/14–22; H04W 40/04–32; H04W 48/08–20; H04W 60/005–06; H04W 72/005–14; H04W 76/10–50; H04W 84/12; H04W 88/02; H04W 88/04–12; H04W 92/10; H04W 92/16–20
See application file for complete search history.

(56) References Cited

U.S. PATENT DOCUMENTS

| | | | |
|---|---|---|---|
| 2015/0373625 A1 | 12/2015 | Lee et al. | |
| 2016/0278081 A1 | 9/2016 | Chun et al. | |
| 2017/0064718 A1* | 3/2017 | Bharadwaj | H04W 72/0493 370/235 |
| 2017/0273140 A1* | 9/2017 | Ryu | H04W 84/12 370/343 |
| 2017/0353961 A1* | 12/2017 | He | H04W 72/082 370/230 |
| 2018/0359697 A1* | 12/2018 | Mestanov | H04W 48/16 370/254 |
| 2018/0376406 A1* | 12/2018 | Au | H04W 48/08 370/338 |

\* cited by examiner

DETERMINATION AND TRANSMISSION OF BSS LOAD METRICS FOR MU WLAN SYSTEMS

CROSS REFERENCE TO RELATED APPLICATION

This patent application claims priority and benefit of U.S. Provisional Patent Application No. 62/361,086, entitled "BSS LOAD METRICS FOR MU WIRELESS LAN," filed on Jul. 12, 2016, the entire content of which is herein incorporated by reference for all purposes.

TECHNICAL FIELD

Embodiments of the present disclosure relate generally to the field of wireless local area networks (WLANs), and, more specifically, to the field of multi-user (MU) transmissions in WLAN systems.

BACKGROUND OF THE INVENTION

In wireless local area network (WLAN) systems, multi-user (MU) transmission technologies allow simultaneous transmissions for multiple user stations (STAs) at speeds compatible with their network interfaces and channel conditions. MU communications can provide high throughput due to effective reuse of the same radio resources among multiple users and due to significantly reduced packet and channel access overheads. A WLAN system compliant with the IEEE 802.11ax standard and specifications may make extensive use of MU communications in both downlink (DL) and uplink (UL) directions, including Multiple-Input Multiple-Output (MU-MIMO) communications and MU Orthogonal Frequency-Division Multiple Access (OFDMA) communications.

In DL MU-MIMO communications, multiple antennas can generate several concurrent spatial streams to transmit data to different user STAs; and in UL MU-MIMO, the different signals received at the antennas of an AP can be used to separate the data sent by multiple user STAs. In MU OFDMA, the whole frequency spectrum of a radio resource is divided into different subchannels or subbands, called resource units (RU), which are allocated to different user STAs for transmitting data simultaneously. For example, the division of a channel can accommodate up to 9 users for every 20 MHz of bandwidth.

There has been a lack of mechanisms for characterizing and reporting BSS load conditions that are specific for MU communications. To improve channel utilization efficiency, facilitate spatial reuse and interference management, and balance loads across multiple BSSs, it is desirable to provide BSS load information that can adequately reflect actual loading in the BSSs for MU communications.

SUMMARY OF THE INVENTION

Accordingly, embodiments of the present disclosure are directed to mechanisms of generating and communicating Basis Service Set (BSS) load information that can be used to effectively increase channel utilization, facilitate reuse of and interference management of spatial streams and frequency subchannels, and balance BSS load for multi-user (MU) communications in WLAN systems.

Embodiments of the present disclosure provide an access point (AP) operable to determine a total number of MU competitors in a BSS, such as a total number of MU-capable user stations (STAs) and a total number of active STAs in the BSS. Particularly, an MU-capable-STA is an STA configured for Multi-User Multiple-Input Multiple-Output (MU-MIMO) communications and/or Orthogonal Frequency-Division Multiple Access (OFDMA) communications. The AP can further determine ratios of PHY Layer Convergence Procedure (PLCP) Protocol Data Unit (PPDU) time to an observation period for MU uplink (UL) and downlink (DL) communications, respectively. This information can effectively indicate a traffic load trend in terms of MU PPDU time with respect to MU UL, MU DL and single user (SU) communications. The AP can further determine an underutilization level of an available frequency bandwidth, including the AP bandwidth and any frequency subchannel or frequency subband, the underutilization level operable to reflect the actual underutilization of spatial streams and frequency channel and subchannels. Also, in characterizing, underutilization of the BSS, the AP can also determine the maximum numbers of RUs (available RU sizes) that are respectively available for different spatial stream sizes. The DL and UL underutilization levels can be determined and reported separately. The MU BSS load information can be included in a beacon frame as a BSS load information element and distributed to user STAs periodically.

The MU BSS load information according to embodiments of the present disclosure can advantageously and effectively characterize an actual BSS load that is pertinent to MU communications. In one exemplary application, such load information can facilitate an unassociated user STA to choose a BSS that offers more transmit and receive opportunities, thereby advantageously improving usage efficiency of radio resources and load balancing among BSSs in a dense and diverse environment.

BRIEF DESCRIPTION OF THE DRAWINGS

Embodiments of the present invention will be better understood from a reading of the following detailed description, taken in conjunction with the accompanying figures, in which like reference characters designate like elements.

DETAILED DESCRIPTION

Figure 1:
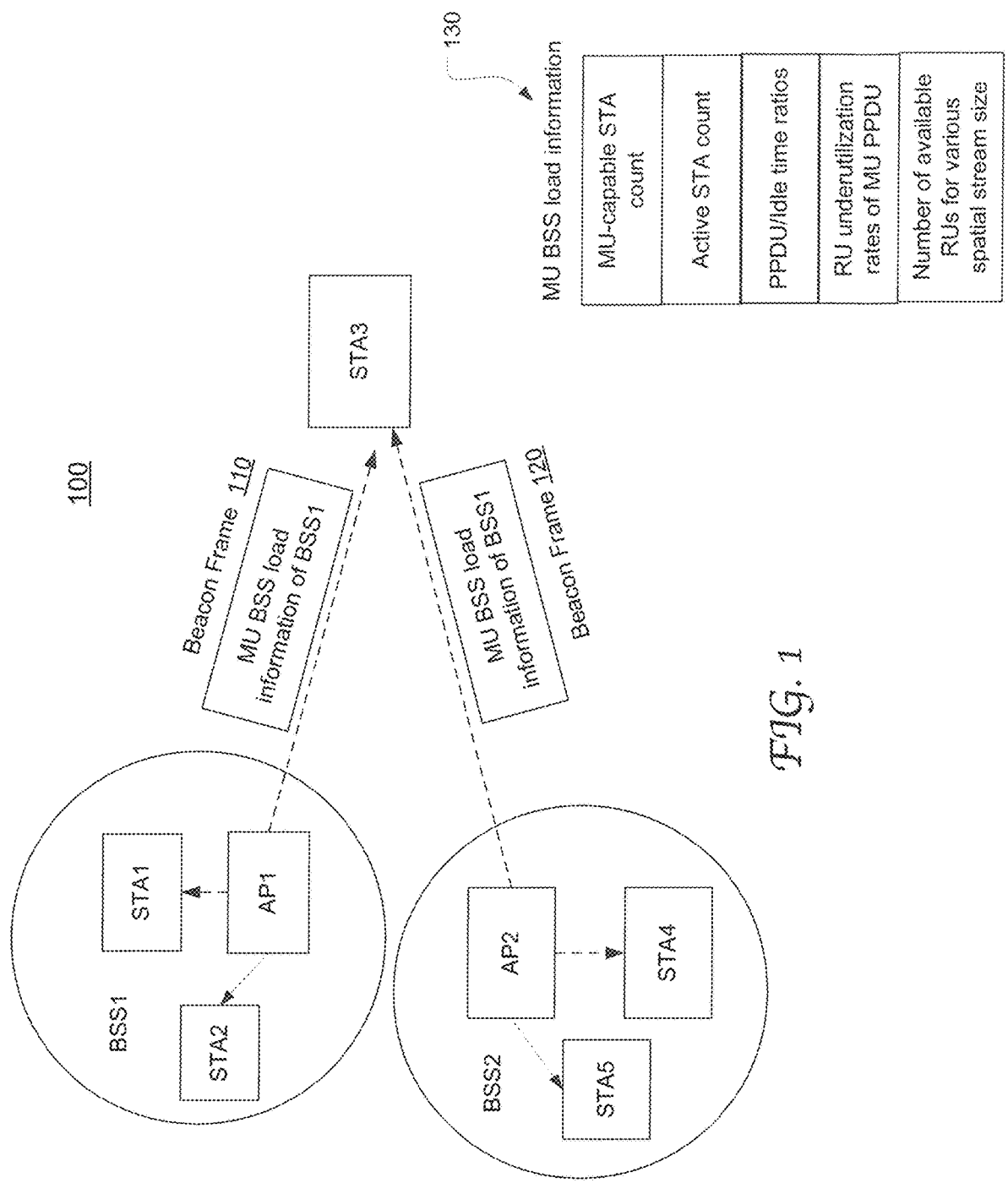
FIG. 1 illustrates an exemplary WLAN system in which MU BSS load information can be communicated between an AP and user STAs and used for AP selection in accordance with an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the Figures. Similarly, although the views in the drawings for the ease of description generally show similar orientations, this depiction in the Figures is arbitrary for the most part. Generally, the invention can be operated in any orientation.

Determination and Transmission of BSS Load Metrics for MU

WLAN Systems

Overall, disclosed herein provides a mechanism of characterizing an actual BSS load with respect to MU communications in wireless local area networks (WLANs). According to embodiments of the present disclosure, an access point (AP) can determine values of several BSS load metrics pertinent to MU communications, including both Multi-User Multiple-Input Multiple-Output (MU-MIMO) communications and MU Orthogonal Frequency-Division Multiple Access (MU OFDMA) communications. The BSS load metrics represent an MU-capable STA count and an active STA count, PHY Layer Convergence Procedure (PLCP) Protocol Data Units (PPDUs) transmission time over an observation period and underutilization levels over space and frequency subbands. The metrics used for characterizing underutilization levels may include underutilization rates (e.g., percentages) for the available frequency bandwidth of an AP or each available subbands, and the maximum number of RUs (RU sizes) available for different sizes of spatial streams.

In general, BSS load information is important for a WLAN system to support an access point (AP) AP association, and other network applications. Existing generations of IEEE 802.11 standards and specifications define Basic Service Set (BSS) load information in the form of BSS load elements of a management frame which can be transmitted to nearby STAs. The load information addresses the current STA population associated with a specific BSS and downlink (DL) MIMO spatial stream underutilization and utilization levels of only selected frequency bandwidths.

However, such load information has become inadequate, or even inaccurate, to characterize the actual load condition of a BSS having various functionalities compliant with the IEEE 802.11ax standards (a so-called high efficiency (HE) BSS), particularly a BSS with the capabilities of MU OFDMA and UL MU-MIMO. With the load information, it is difficult for an STA to choose an AP that offers the strongest receive power and sufficient transmission opportunities. This inevitably leads to the undesired situation that some over-loaded APs are associated with too many STAs while others are underused, especially in dense WLAN scenarios.

Accordingly, embodiments of the present disclosure provide MU BSS load information by using additional load metrics that can characterize the actual load condition of a BSS with respect to MU communications. In some embodiments, the values of the load metrics can be used by an MU-capable STA to make informed decisions in selecting and associating with an AP that offers optimal receive power and transmission opportunities.

FIG. 1 illustrates an exemplary WLAN system 100 in which MU BSS load information can be communicated between an AP and user STAs and used for AP selection in accordance with an embodiment of the present disclosure. In a basic form, the WLAN system 100 includes two high efficiency (HE) BSSs, BSS1 and BSS2. Each BSS includes an AP (AP1 and AP2) and a plurality of associated user STAs (e.g., STA1 and STA2 for BSS1, and STA4 and STA5 for BSS2). The user STAs in each BSS are MU-capable STAs and are operable to communicate with the AP by MU-MIMO and/or OFDMA communications.

The STA3 is an unassociated STA looking for a BSS to join, and BSS1 and BSS2 are both eligible for STA3. According to embodiments of the present disclosure, the AP of each BSS (BSS1 or BSS2) can generate and distribute MU BSS load information to the user STAs by using beacon frames 110 or 120, including the STAs associated with the BSS and the unassociated STA3. According to embodiments of the present disclosure, as shown in Table 130, the MU BSS load information is represented by several metrics: MU-capable STA count; active STA count; PPDU transmission time to idle time ratio; underutilization rates of MU PPDU transmissions including RU underutilization; and/or maximum RU sizes available for various spatial stream sizes, which are described in greater detail below.

After receiving the beacon frames from both BSSs, the unassociated STA3 can analyze the MU BSS load information and compare the actual load conditions of the two BSSs with respect to MU transmissions. Based on the evaluation and comparison, STA3 can select an optimal BSS to join. Depending on the implementation, the STA3 may use values of some or all the metrics shown in Table 130. Further STA3 may use any suitable AP selection heuristic or process that is well known in the art without departing from the scope of the present disclosure. It will be appreciated that the MU BSS load metrics may be used in an AP selection heuristic or other application programs or functional modules in any suitable manner that is well known in the art.

According to embodiments of the present disclosure, the total number of MU-capable STAs is used as a metric to indicate the population of MU STAs competing for resources within a BSS, where an MU-capable STA refers to an STA capable of performing MU-MIMO and/or MU-OFDMA operations.

In practice, because some STAs often stay active for only a brief time, the number of active STAs in a BSS can be used as an important indication of actual BSS load as well. Two types of active STA counts may be separately determined, including active STA count and active MU-capable STA count. In some embodiments, to determine an active STA count, an AP can monitor each STA's activities in a prescribed observation period, for example in units of beacon intervals. An STA is counted as an active STA if the AP receives any Media Access Control (MAC) protocol Data Unit (MPDU) or PPDU from it during the observation period. It will be appreciated that a metric of a variant form may also be used to convey information regarding a total number of MU-capable STAs or a total number of active STAs.

In an exemplary instance, the MU BSS load information in the beacon frames 110 and 120 respectively indicates that BSS1 currently has 100 active STAs with 5 active MU-capable STAs, and that BSS2 currently has 100 STAs with 95 active MU capable STAs. Accordingly, the unassociated STA3 may choose BSS2 for more transmit and receive opportunities, advantageously contributing to efficient use of radio resources and load balancing among the BSSs, especially in dense and diverse WLAN scenarios.

In the illustrated example, the MU BSS load information is contained in a beacon frame and transmitted from the AP periodically. However it will be appreciated that the present disclosure is not limited to any specific type of frame(s) that can carry the MU load information; nor is it limited by any format or protocol of representing and transmitting such information. For example, the MU BSS load information may be carried either in a new element or in the extension of a legacy BSS load element as defined in IEEE 802.11. In some other embodiments, the several load metrics shown in the table 130 (FIG. 1) can be dispersed in different types of frames.

Some STAs may have specific requirements for different categories of MU communications, such as MU DL, MU UL and SU DL transmissions. Thus, it is beneficial to provide BSS load information specific to each category of communications of interest. With this information, an STA with specific UL or DL requirements can better assess a BSS load based on recent UL/DL and SU/MU PPDU occupancy time. According to embodiments of the present disclosure, a ratio of PPDU time to medium idle time or a ratio of PPDU time to an observation period, or any variant form thereof, can be used as a metric indicating the MU/S PPDU utilization rates to characterize the MU BSS load condition with respect to a specific category of MU transmission. For example, a low ratio for UL MU PPDUs may indicate a situation that the HE BSS mostly uses SU communications to handle the UL load. An HE BSS with a high ratio of trigger frame (TF) PPDU may indicate that the BSS is heavily loaded with UL transmissions.

Determining a ratio of PPDU time to medium idle time (or to an observation period) involves determining the accumulated transmission time of the PPDUs of a particular transmission category in a prescribed observation period. An observation period may be prescribed in units of beacon intervals and corresponds to the most recent time interval that the AP monitors the PPDU transmissions.

Figure 2A:
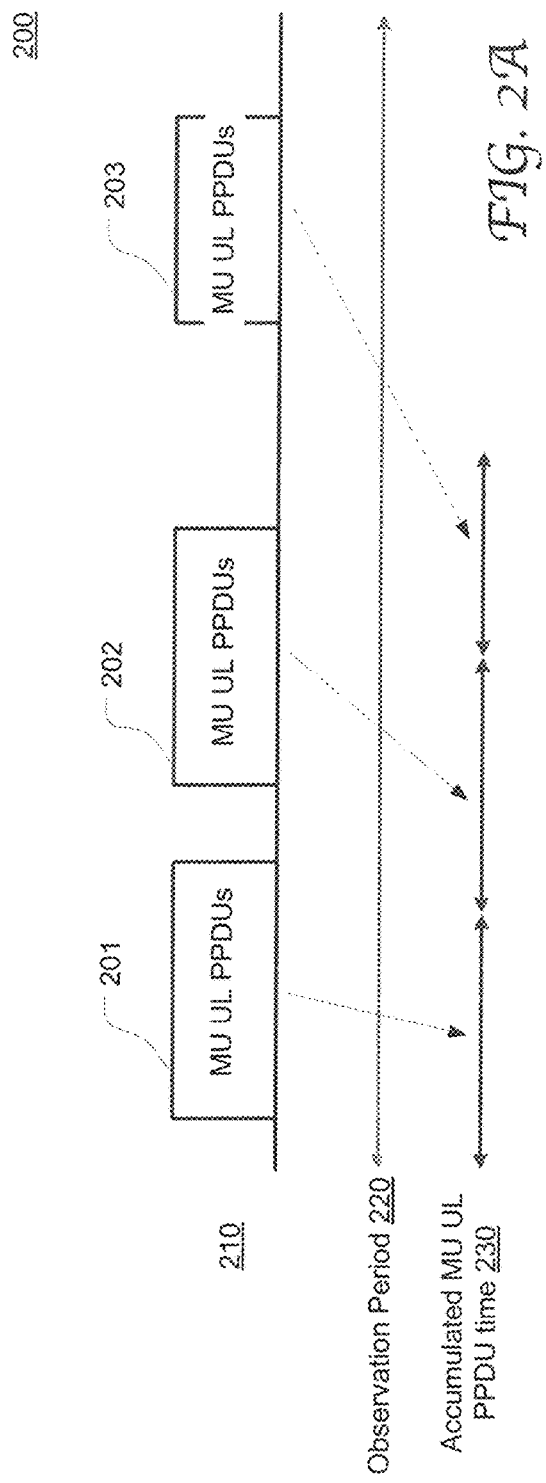
FIG. 2A illustrates an exemplary relation of MU UL PPDU time in relation to idle time in accordance with an embodiment of the present disclosure.

FIG. 2A illustrates an exemplary relation of MU UL PPDU time in relation to idle time in accordance with an embodiment of the present disclosure. Diagram 210 shows that a number of PPDUs 201-203 are transmitted within an observation period 220 in a BSS. The length of each box in 210 represents the busy time period of the corresponding MU UL PPDU time. Diagram 230 represents the accumulated time for MU UL PPDUs. Thus, a ratio of MU UL PPDU time to idle time can be derived by dividing the accumulated PPDU time 230 by the idle time which equals the observation period 220 minus the accumulated PPDU time 230. In some embodiments, idle time may be measured after the backoff timer becomes 0 and the medium continues to be idle.

Figure 2B:
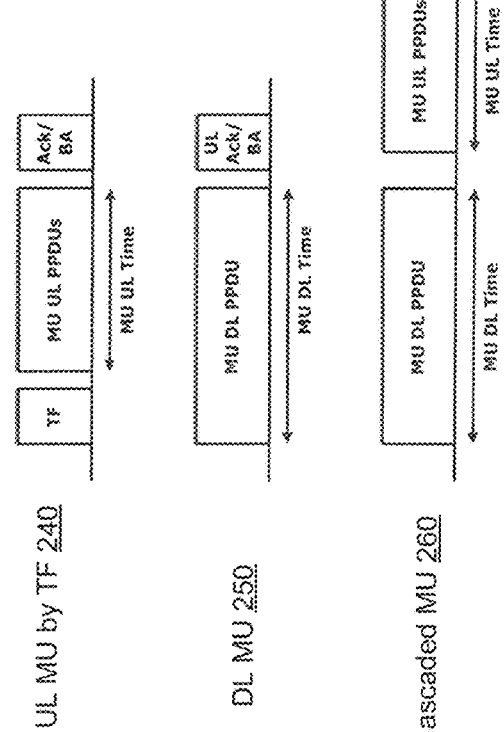
FIG. 2B illustrates exemplary timing diagrams of PPDU transmissions in different categories of MU transmissions in accordance with an embodiment of the present disclosure.

In the same manner, the ratios of PPDU time to idle time (or observation period) for MU DL and SU DL transmissions can be determined as well. The calculated ratios for various categories of transmissions can be reported separately. FIG. 2B illustrates the exemplary timing diagrams of PPDU transmissions in different categories of MU transmissions in accordance with an embodiment of the present disclosure. Diagram 240 shows transmission of MU UL PPDUs following a trigger frame (TF) and before an acknowledgement/block acknowledgement frame (Ack/BA). Only the time occupied by the MU UL PPDUs accounts for the PPDU time for determining the ratio for MU UL transmissions. Diagram 250 shows transmissions of MU DL PPDUs before an UL acknowledgement/block acknowledgement frame (UL Ack/BA). Only the time occupied by the MU DL PPDUs accounts for the PPDU time for calculation of the ratio for MU DL transmissions. Diagram 260 shows the cascaded MU transmissions of DL PPDU and UL PPDUs. The time occupied by MU DL PPDU transmissions and the time occupied by MU DL PPDU transmissions are accumulated for MU DL time and MU UL time respectively.

According to embodiments of the present disclosure, an underutilization rate (e.g., utilization percentage) of each available frequency subband and/or the entire available bandwidth in a BSS can be used as metrics for characterizing MU BSS load. The metrics can be informative as to which resource units are available for an incoming STA to use.

In some embodiments, the underutilization rate of a specific type of transmissions (e.g., MU DL PPDU, MU UL PPDU, or a combination thereof) for a particular bandwidth (e.g., entire bandwidth of the AP, an interested subband, or any combination of subbands, and etc.) can be determinate based on a sum of occupied time of each PPDU transmission occasion multiplied by the corresponding occupied spatial stream size (Nss) and the corresponding occupied RU weight in a prescribed period.

For example, the underutilization rate MU DL PPDU transmissions for an interested frequency bandwidth in an observed period can be represented as:

$$\frac{N_{max\_SS} \times RU_{max} \times \sum_j T_{Busy(MUDL),j} - \sum_j \left[ T_{Busy(MUDL),j} \left( \sum_i N_{SS,i,j} \times RU_{Busy,i,j} \right) \right]}{N_{max\_SS} \times RU_{max} \times \sum_j T_{Busy(MUDL),j}}$$ (Equation 1)

where:
j represents the index of MU DL PPDU transmission occasion in the observed period;
i represents the index of occupied RU;
$N_{max\_SS}$ represents the maximum number of supported spatial streams for the available bandwidth;
$RU_{Busy\,i,j}$ represents RU weight of the occupied $i^{th}$ RU in the $j^{th}$ MU DL PPDU transmission occasion;
$RU_{max}$ represents maximum available RU weight of the available bandwidth (excluding RU being used, punctured or interfered, etc.); and
$T_{Busy(MUDL),\,j}$ represents busy time for $j^{th}$ MU DL PPDU transmission occasion.

It will be appreciated that $N_{max\_SS}$ and $RU_{max}$ are functions of the interested available bandwidth. For example, in calculating the underutilization rate of the AP with 80 MHz bandwidth, $RU_{max}$ equal to 1 can be used; in calculating the underutilization rate of a 20 MHz subband, $RU_{max}$ equal to ¼ can be used. Further, the RU weights ($RU_{Busy\,i,j}$) used for calculating every 20 MHz bandwidth may be:

RU26: 1/9
RU52: 2/9
RU106: 4/9
RU242: 9/9
RU484: 9/9 (half on the target 20 MHz).

However, this discussion is merely exemplary. Any other suitable manner to represent RU weight can also be used without departing from the scope of the present disclosure.

The maximum numbers of indexes j and i used for the summations are dependent on the observed period. Thus, depending on the values used for the parameters, Equation 1 can be used to calculate the underutilization rates of any specific category of transmissions, such as MU DL and MU UL. Equation 1 can be used to calculate the underutilization rate of any specific bandwidth, e.g., the entire available bandwidth of the AP, respective subbands, or combinations of subbands. These results can be determined and reported separately by an AP. Derivation of these equations based on Equation 1 is trivial to those skilled in the art and thus is omitted in the interest of brevity.

Figure 3A:
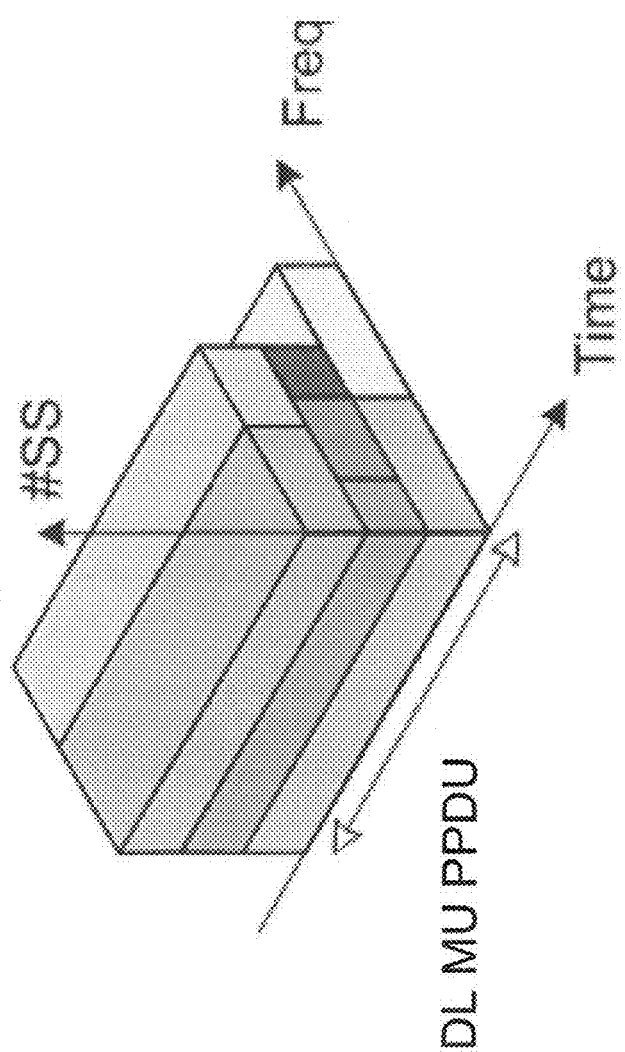
FIG. 3A illustrates an exemplary resource utilization level in a BSS in terms of spatial stream usage, frequency usage (RU) and DL MU PPDU time in accordance with an embodiment of the present disclosure.

FIG. 3A illustrates an exemplary resource utilization level in a BSS in terms of spatial stream usage, frequency usage (RU usage) and DL MU PPDU time in accordance with an embodiment of the present disclosure. As shown in FIG. 3A, the utilization level is represented by the volume of the 3-dimension plot, which is the integration over the 3 dimensions. The underutilization level then corresponds to the volume outside the illustrated volume. The illustrated 3 spatial streams are allocated with a different number of RUs. The allocated RUs may have different frequency bandwidths and different RU weights (each segment along the "Freq" axis represents an individual RU), e.g., ranging from 1 MHz to 126 MHz.

An underutilization rate defined in Equation 1 factors in spatial stream usage and frequency subband usage and PPDU time for all the PPDU transmission time in an observed period, and thus can advantageously and effectively characterize the underutilization levels over space and frequency of a BSS. Any other suitable mathematical formula of underutilization rate over space and frequency may be used without departing from the scope of the present disclosure.

An underutilization rate that integrates over all the occupied spatial streams and occupied RUs can generally characterize resource availability in a BSS, but in some cases this lump-sum information may not be sufficient for an STA to assess BSS load for particular use requirements. According to embodiments of the present disclosure, an AP can also generate and report a maximum number of RUs available (or an available RU size) for a specific number of spatial streams (or a specific spatial stream size), or a size of available spatial streams for a specific RU size. More specifically, an available RU size can be determined for OFDMA only, and for Nss=1, 2, . . . , M (e.g., M=8).

In some embodiment, a mean (or average) available RU size for a particular spatial stream size (Nss) can be determined and reported based on observation in a prescribed period over the channel bandwidth. For example, a mean available RU size can be determined by recording the maximum RU size (RU_max_i) available in each PPDU transmission in the observed period ($i^{th}$ transmission occasion, i=1, . . . , L), summing all the RU_max_i, and averaging the sum by the total number of PPDU transmission occasions (L). An average available RU size can be quantized to a closest integer. For instance 3.5 by average can be quantized to 3 (average available RU size=3). In some embodiment, a maximum available RU size for one PPDU transmission can be determined and reported by identifying the maximum available RU size among all PPDU transmissions (MAX(RU_max_1, . . . RU_max_i, . . . , RU max L)). For Nss up to 8, 4 octets may be used for indicating the respective maximum available RU sizes in the report, 3 bits per case and 9 cases in total.

Figure 3B:
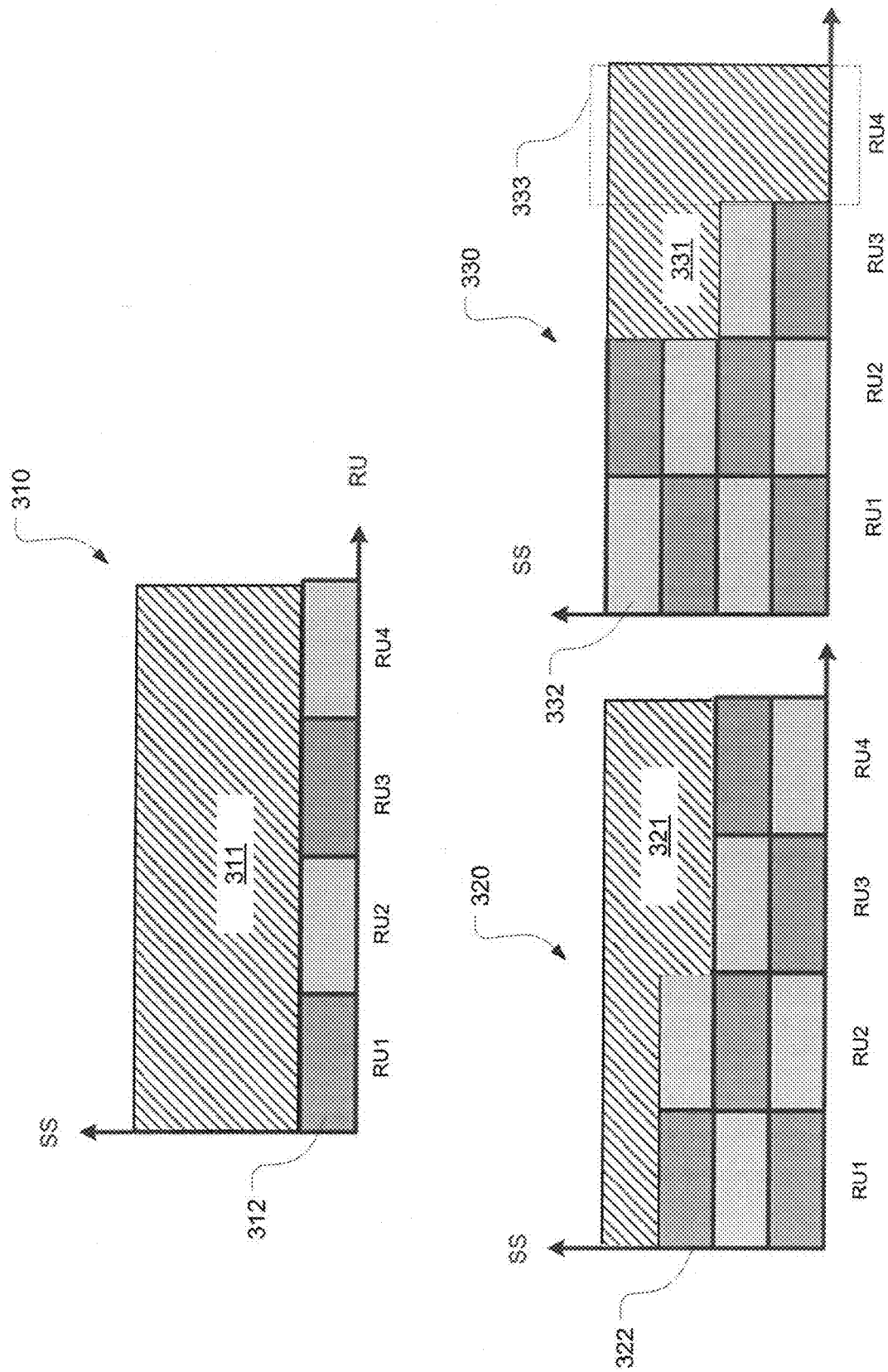
FIG. 3B are area diagrams depicting the reported underutilization levels as a function of RU and spatial stream for 3 example cases in accordance with the prior art.

FIG. 3B are area diagrams depicting the reported underutilization levels as a function of RU and spatial stream for 3 example cases in accordance with the prior art. The shaded areas (e.g., 312, 322, 332) represent the occupied resources as functions of spatial stream (the vertical axis "SS") and RU (horizontal axis "RU") and the patterned areas (311, 321 and 331) represent underutilized resources. In a simplified form, there are 4 spatial streams and 4 RUs available for use in the BSS.

In Case 1 shown in diagram 310, each RU is occupied and a single spatial stream is used. The reported underutilization percentage would be 75%. For STAs with only OFDMA capabilities, there is no resource available for them in the BSS. However, these STAs cannot learn about this unavailability with the reported lump-sum underutilization percentage 75%.

As depicted by the respective patterned areas in Case 2 (321 shown in diagram 320) and Case 3 (331 shown in diagram 330), the same underutilization percentage would be reported for both cases. For an STA capable of supporting 3 spatial streams, it would be particularly useful to provide the information on the underutilization level of RUs available for 3 spatial streams. Diagram 320 shows there is no RU available for 3 spatial streams; while diagram 330 shows that there is one RU (RU4) available for 3 spatial streams (patterned area within the dashed box 333). However, with just the reported lump-sum underutilization percentages (represented by the patterned areas 321 and 331) cannot provide such information.

Figure 3C:
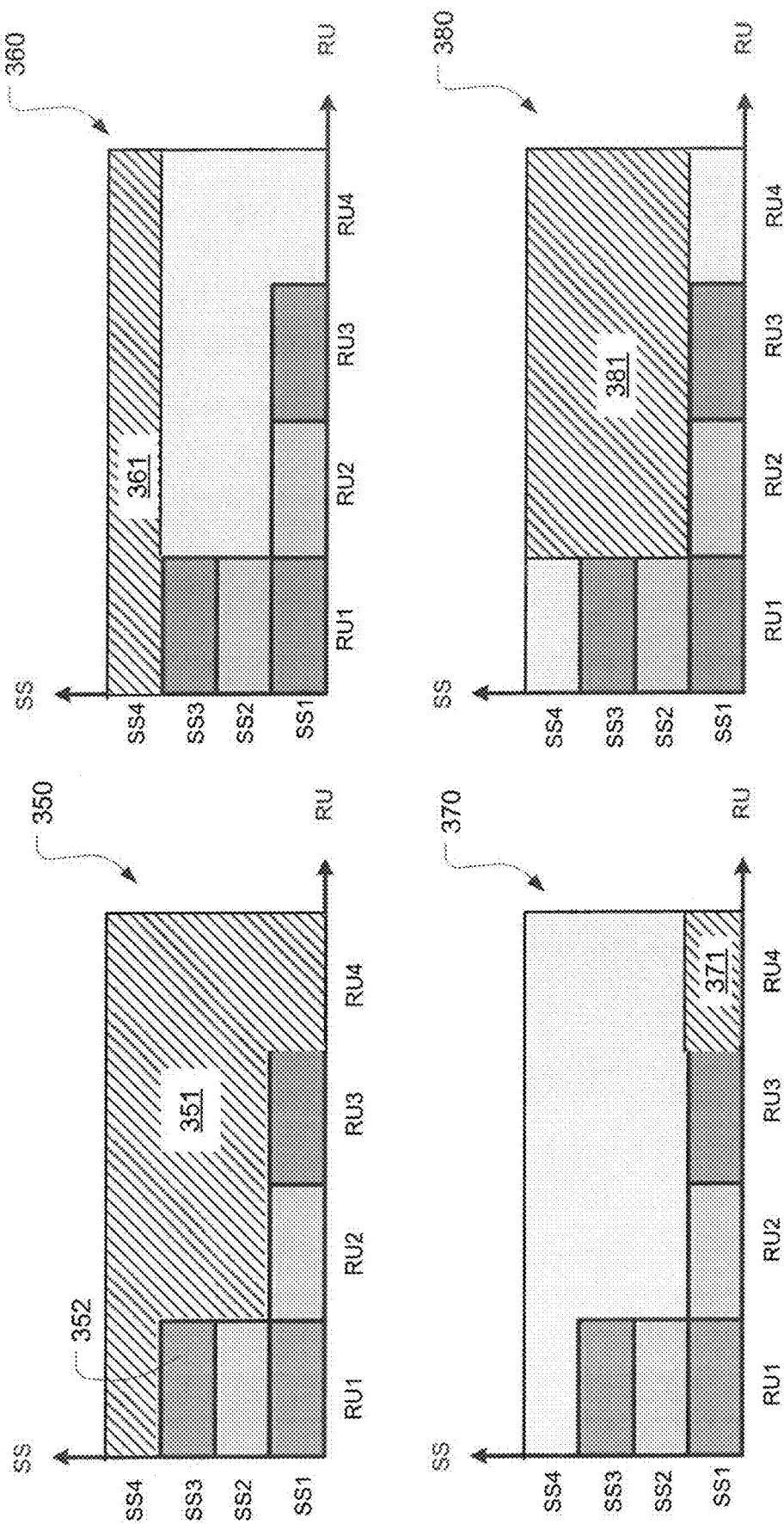
FIG. 3C are area diagrams illustrating exemplary reported RU underutilization levels for various spatial stream sizes for an example case in accordance with an embodiment of the present disclosure.

FIG. 3C are area diagrams depicting exemplary reported underutilization levels and available RU sizes with respect to various spatial stream sizes for an example case in accordance with an embodiment of the present disclosure. In each diagram, the shaded areas (e.g., 352) represent the occupied resources as functions of spatial stream and RU, and the sizes of the patterned areas (351, 361, 371, and 381) represents different reported underutilization rates. In a simplified form, there are 4 spatial streams and 4 RUs for use in the BSS.

The patterned area 351 in diagram 350 represents the lump-sum availability (the underutilization level) with respect to spatial stream and RU in the BSS. The patterned area 361 in diagram 360 represents the underutilization of a size of 1 spatial stream. The area 361 indicates that all 4 RUs are available for this spatial stream (RU4). In some cases, based on the reported information shown in 360, RU1-RU4 can be allocated to one STA, e.g., a combined unit.

The patterned area 371 in diagram 370 represents resource underutilization that is available for OFDMA-only transmissions, and indicates that only one RU (RU4) is available for OFDMA only transmissions. This information can be especially useful for an STA with OFDMA capability but without MU-MIMO capability. The patterned area 381 in diagram 380 represents resource underutilization for a size of 3 spatial streams and indicates that 3 RUs (RU2-RU4) are available for the size of 3 spatial streams. For example, in case that an STA can support or request 3 spatial streams, RU2-RU4 can be allocated to the STA together based on the reported information e.g., as a combined unit. The underutilization rate of each spatial stream size may be calculated by using Equation 1.

The underutilization rates for MU DL and MU UL transmissions can be determined and reported separately. It will be appreciated that, provided with Equation 1, deriving the equation for calculating MU UL underutilization rate of a particular frequency bandwidth is trivial. Thus, the mathematical expression is omitted for brevity. Further, an underutilization rate for each 20 MHz subband can be determined and reported separately. Provided with separate statistic reports on UL and DL resource utilization, an STA can advantageously identify a suitable HE BSS tailored to its traffic requirements.

Figure 4:
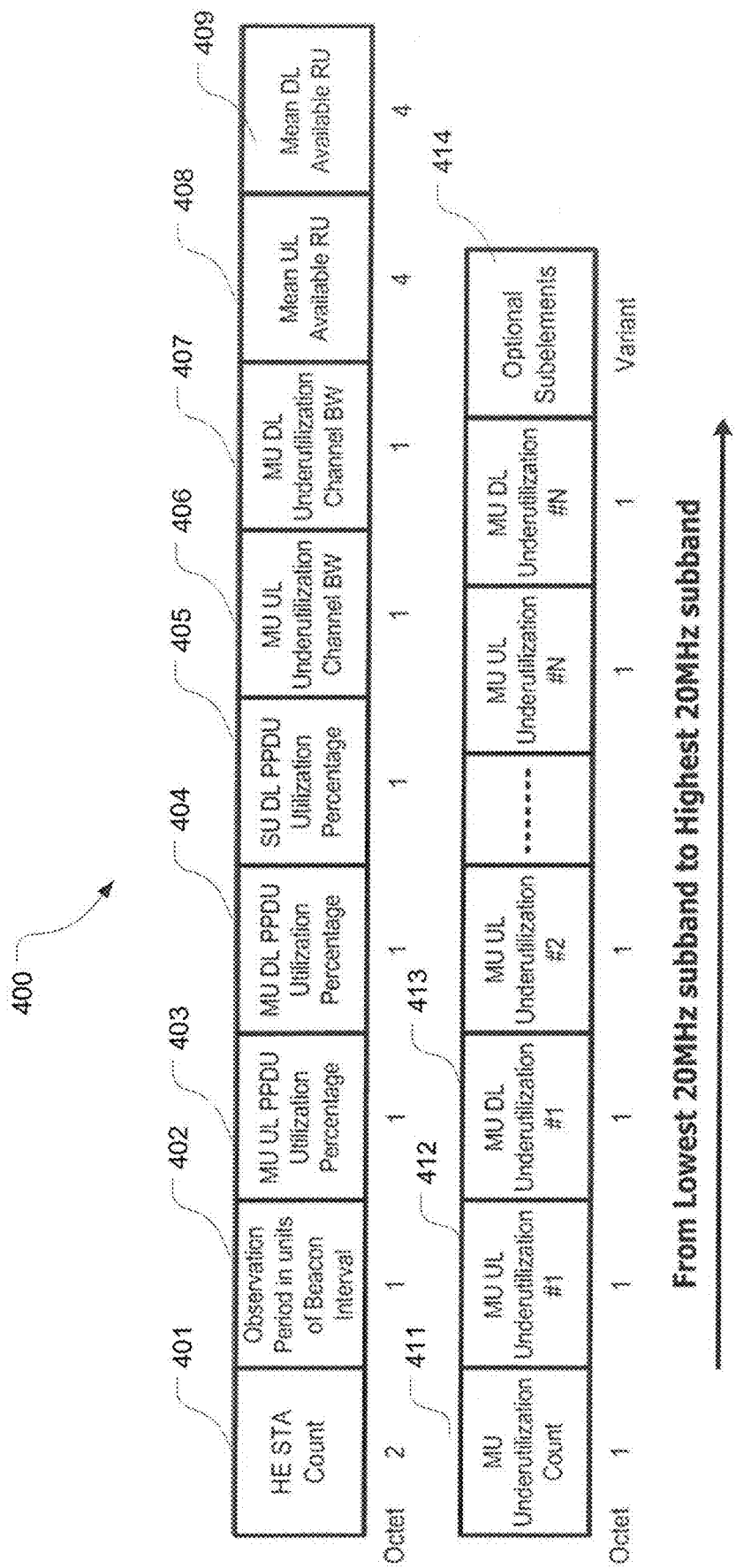
FIG. 4 illustrates an exemplary frame format for carrying MU BSS load information as described above.

The present disclosure is not limited by any communication protocol or the type of frame or format used for conveying the MU BSS load information as described above. FIG. 4 illustrates and exemplary frame format for carrying MU BSS load information as described above. In this example, an MU BSS load information element 400 is defined and has the fields for MU-capable STA count of the AP ("HE STA Count") 401, prescribed observation period in units of beacon intervals 402, MU UL PPDU utilization rate 403, MU DL PPDU utilization rate 404, SU DL PPDU utilization rate 405, MU UL underutilization channel bandwidth of the AP 406, MU UL underutilization channel bandwidth of the AP 407, mean UL available RU 408, and mean DL available RU 409. The BSS load information element 400 may be in a format that is compatible with the IEEE 802 11 family.

The BSS load information element 400 may further include the fields for MU underutilization count 411, UL and DL underutilization rates of a number of (N) frequency subbands (e.g., 412 and 413), from the lowest 20 MHz subband to the highest 20 MHz subband. However the present disclosure is not limited to such specific subband division. For instance, the number of 20 MHz subbands (N) may be 4 or 16 (80 MHz or 160 MHz).

Figure 5:
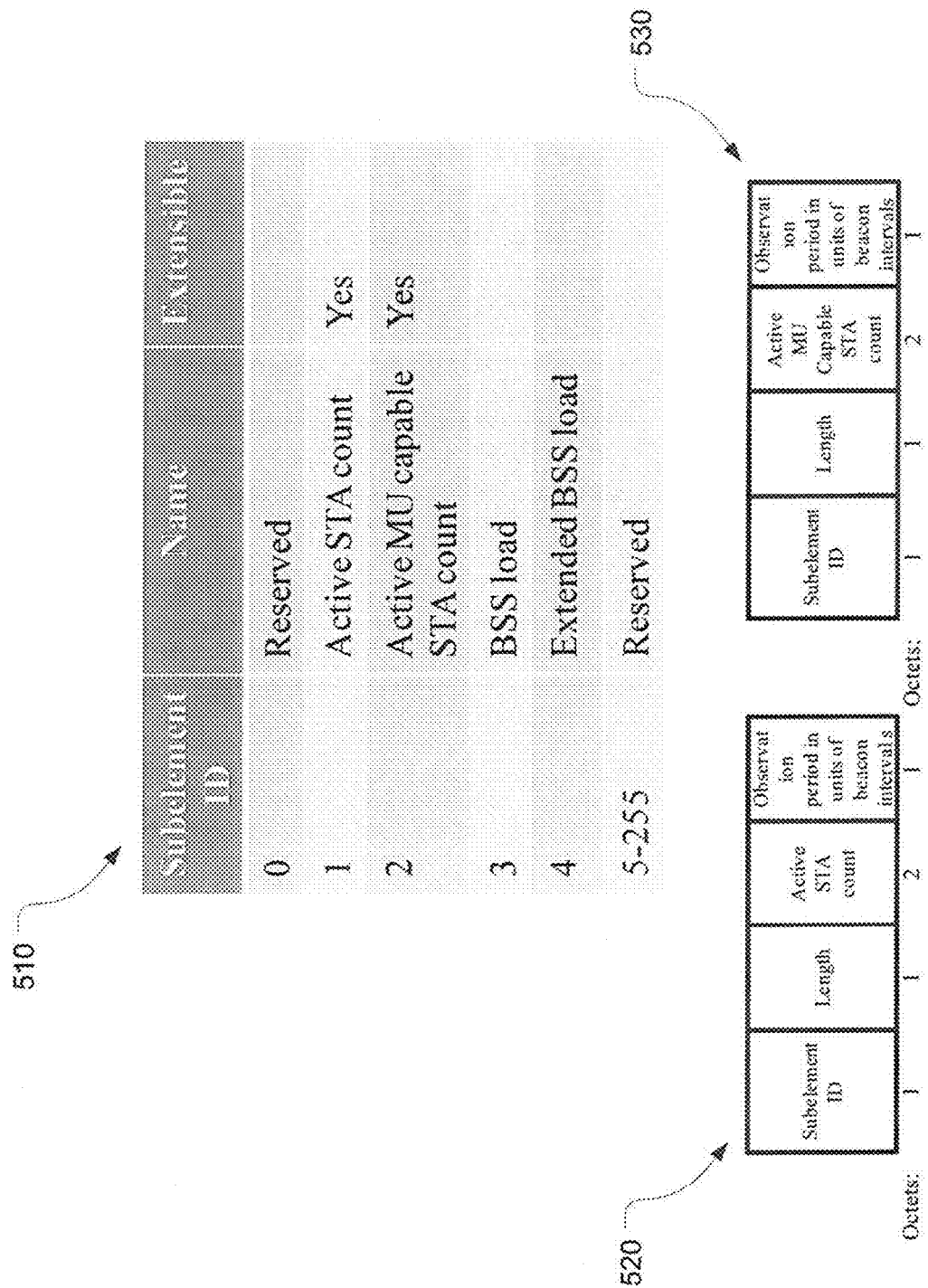
FIG. 5 illustrates an exemplary format of the optional subelements carrying active STA counts in accordance with an embodiment of the present disclosure.

The optional subelements 414 can be used to carry active STA counts and legacy BSS load information elements (IEs). FIG. 5 illustrates an exemplary format of the optional subelements carrying active STA counts in accordance with an embodiment of the present disclosure. As shown in diagram 510, the subelements 1 and 2 are used to indicate active STA count and active MU capable STA count. Other subelements in 510 can be used to carry legacy BSS load elements, such as the BSS load element (subelement 3) and the extended BSS load element (subelement 4) as defined in IEEE 802.11 11ax. Diagram 520 shows the format of the active STA count subelement and the active MU-capable STA count format.

Figure 6:
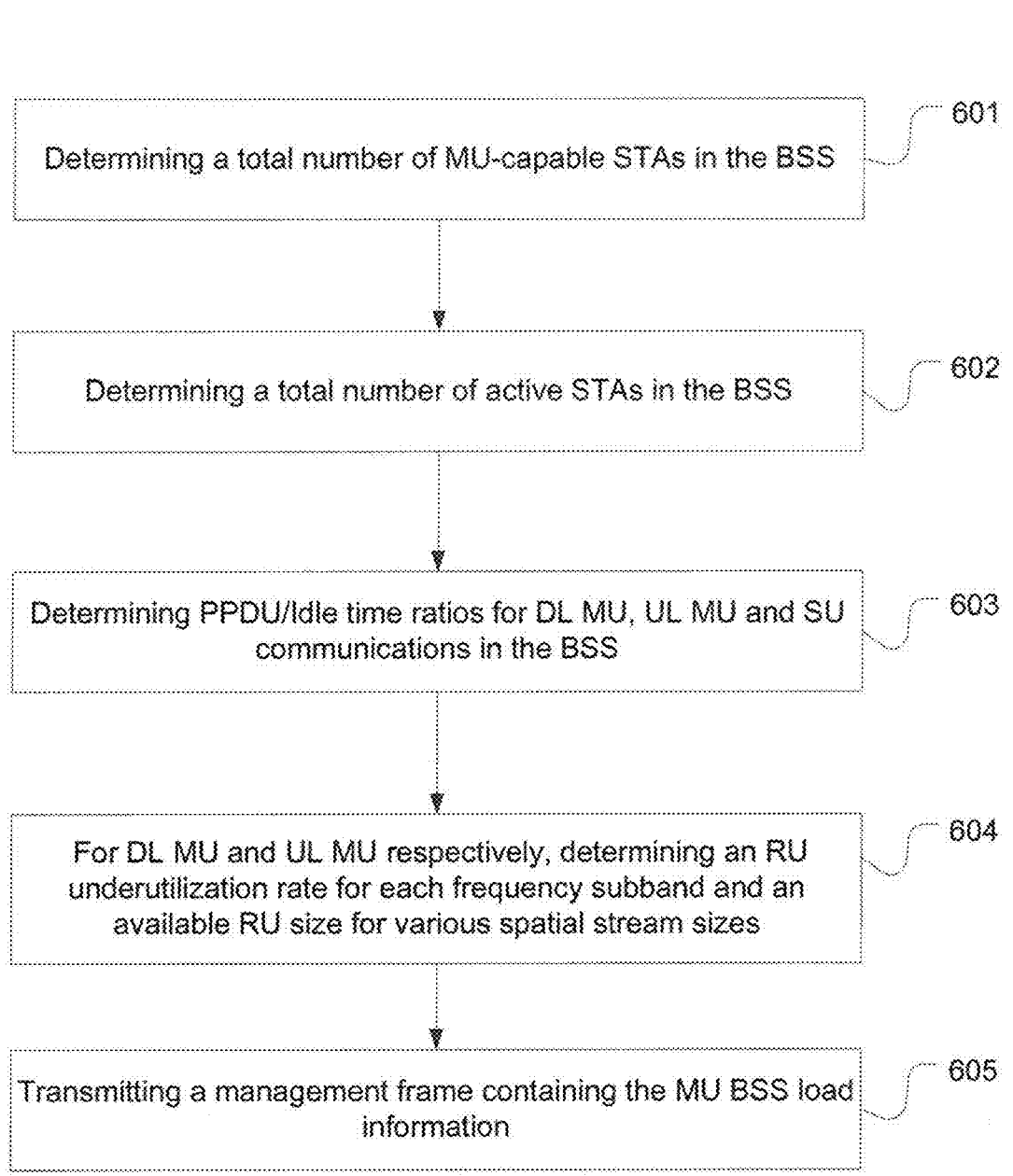
FIG. 6 is a flow chart depicting an exemplary computer controlled process of providing MU BSS load information in accordance with an embodiment of the present disclosure.

FIG. 6 is a flow chart depicting an exemplary computer controlled process 600 of providing MU BSS load information in accordance with an embodiment of the present disclosure. Process 600 may be performed by an AP in a BSS with MU capabilities and configurations. At 601, a total number of MU-capable of STAs in the BSS is determined. At 602, the total number of active STAs in the BSS is determined. At 603, the PPDU/idle time ratios are determined for DL MI, UL MU and SU communications in the BSS, respectively. At 604, an underutilization rate of each available frequency subband is determined for DL and UL communications respectively. In addition, the available RU sizes for various spatial stream sizes are determined. For example, an RU is regarded as available if it is neither used nor punctured nor interfered. The methods and processes of determining the MU BSS load information in 601-604 are described in greater detail above with reference to FIGS. 1-4. At 605, a management frame including the values of the MU BSS load metric resulted from 601-604 is generated and transmitted. The management frame may be a beacon frame or any other transmission unit, as described in greater detail with reference to FIGS. 4-5.

Figure 7:
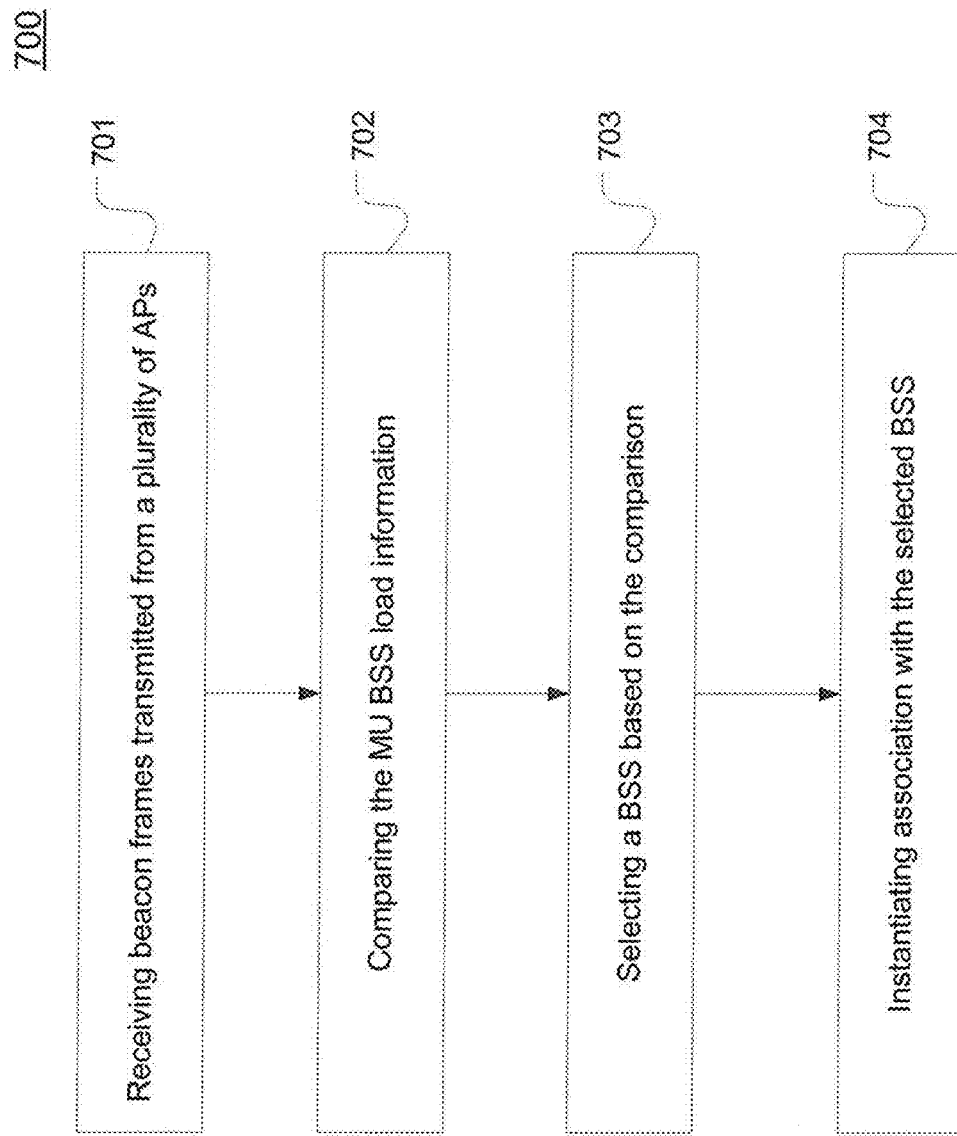
FIG. 7 is a flow chart depicting an exemplary computer controlled process of using MU BSS load information for AP selection in accordance with an embodiment of the present disclosure.

FIG. 7 is a flow chart depicting an exemplary computer controlled process 700 of using MU BSS load information for AP selection in accordance with an embodiment of the present disclosure. Process 700 may be performed by an unassociated user STA looking for a BSS to join. At 701, the user STA receives beacon frames from a plurality of APs nearby, each AP associated with a BSS. At 702, the beacon frames are processed to extract and evaluate the MU BSS load information of the multiple BSSs. Based on the load information, the MU BSS load of the multiple BSSs are compared. At 703, a BSS is selected based on the comparison. The present disclosure is not limited to any specific criteria, heuristic or process to analyze, evaluate, compare or otherwise use the MU BSS load information. At 704, the user STA initiates association with the selected BSS.

Figure 8:
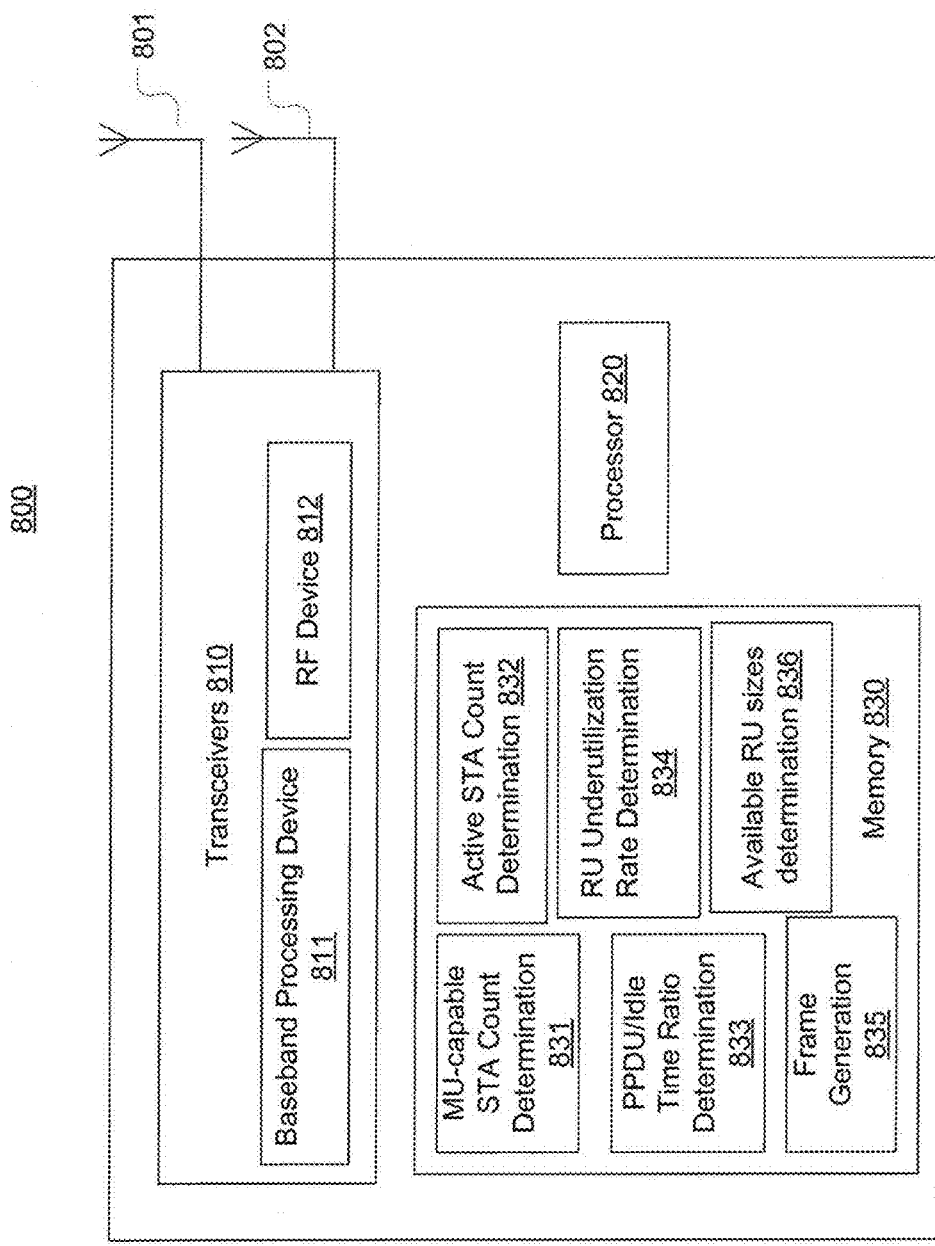
FIG. 8 is a block diagram illustrating a configuration of an exemplary wireless AP device operable to provide MU BSS load information in accordance with an embodiment of the present disclosure.

FIG. 8 is a block diagram illustrating the configuration of an exemplary wireless AP device 800 operable to provide MU BSS load information in accordance with an embodiment of the present disclosure. The AP device 800 can be associated with a BSS in a WLAN and can control and manage association of a plurality of user STAs with the BSS. The AP device 800 may be a router or any other suitable network device and can perform MU-MIMO and MU-OFDMA operations in the WLAN.

The AP device 800 includes a wireless transceiver 810 having a baseband processing device 811, a radio frequency (RF) device 812 and antennas, e.g., 801 and 802. The baseband processing device 811 may include a variety of components configured to perform baseband processing, including Analog-to-Digital conversion (ADC), Digital-to-Analog Conversion (DAC), gain adjusting, modulation/demodulation, encoding/decoding, and so on.

The RF device 812 can receive the RF wireless signals via the antennas 801 and 802, convert received RF signals to baseband signals for supply to the baseband processing device 811. The RF device 812 can also receive baseband signals from the baseband processing device 811, convert them to RF wireless signals and send to the antennas 801-802 for transmission. The RF device 812 may include a variety of components that are well known in the art.

The AP device 800 further includes a memory 830 storing information, application programs and functional modules related to determination of various MU BSS load information as described in greater detail above. Particularly, the memory 830 includes a module 831 configured to generate MU-capable STA counts, a module 832 configured to generate active STA counts, a module 833 configured to generate PPDU time/idle time ratios, a module 834 configured to generate frequency subband underutilization rates, and a module 836 configured to generate available RU sizes for specific spatial stream sizes. The memory further includes a module 835 configured to generate frames that carry the information produced by modules 831-834. The processor 820 can execute the application programs and functional modules stored in the memory 830 and thereby enable the device 800 to perform determination and transmission of the MU BSS load information. The processor 820 may be integrated in a central processing unit (CPU) or the transceiver 810, or may be a separate processing engine in the device. The memory 830 and the processor 820 may include a range of other components and functions that are well known in the art.

Figure 9:
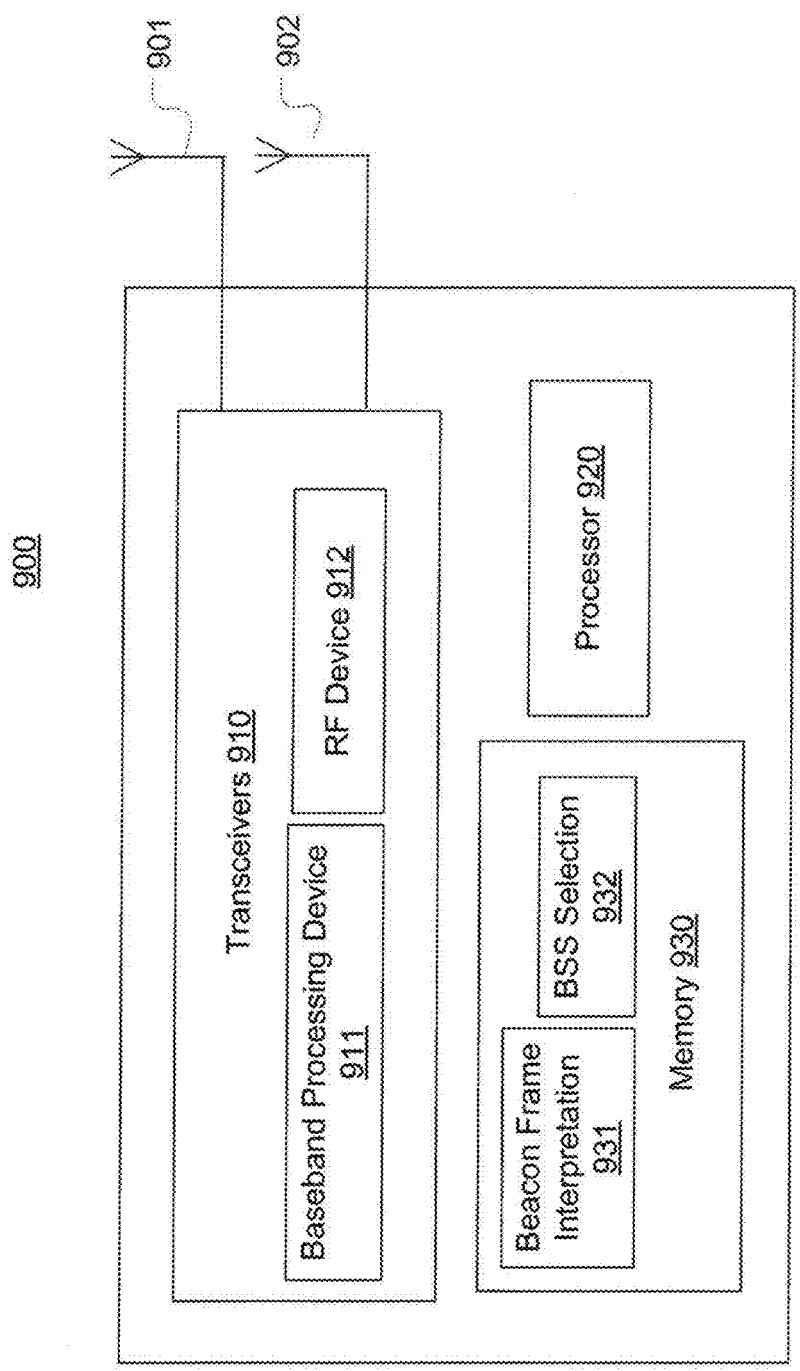
FIG. 9 is a block diagram illustrating a configuration of an exemplary wireless user STA device configured to process MU BSS load information transmitted from an AP STA in accordance with an embodiment of the present disclosure.

FIG. 9 is a block diagram illustrating the configuration of an exemplary wireless user STA device 900 configured to process MU BSS load information transmitted from an AP STA in accordance with an embodiment of the present disclosure. The user STA 900 can perform MU-MIMO and/or MU-OFDMA operations when coupled to a WLAN. Device 900 may be a general purpose computer, a laptop, a desktop, a mobile phone, smart TV, game console, or other type of computing devices, etc.

The device 900 also includes a transceiver having a baseband processing device 911, an RF device 912 and antennas, e.g., 901 and 902. The baseband processing device 911 may include a variety of components configured to perform baseband processing, including Analog-to-Digital conversion (ADC), Digital-to-Analog Conversion (DAC), gain adjusting, modulation/demodulation, encoding/decoding, and so on. The RF device 912 can receive the RF wireless signals via the antennas 901 and 902, convert received RF signals to baseband signals for supply to the baseband processing device 911. The RF device 912 can also receive baseband signals from the baseband processing device 911, convert them to RF wireless signals and send to the antennas 901-902 for transmission. The RF device 912 may include a variety of components that are well known in the art.

The device 900 includes a processor 920 and a memory 930 storing a wide range of information, application programs and functional modules that are executable by the processor 920. Particularly, the memory 930 includes a module for beacon frame interpretation 932 and configured to process beacon frames and extract MU BSS load information therefrom. The memory 930 further includes a module 932 for BSS or AP selection and configured to select an AP or BSS based on the MU BSS load information and according to a selection algorithm. The device 900 may include a range of other components and functions that are well known in the art and may be implemented by using hardware logic, software logic or a combination thereof.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of wireless communication, the method comprising:
   at an access point (AP), determining load information of a Basic Service Set (BSS), wherein said determining load information comprises one or more of:
   determining first information representing one or more of: a count of active stations (STAs) in said BSS in a first prescribed period; and a count of active multi-user (MU)-capable STAs in said BSS in said first prescribed period, wherein said AP has received data packets from each of said active STAs or each of said active MU-capable STAs in said first prescribed period;
   determining second information representing an underutilization of resource units (RUs) usable on multiple spatial stream sizes in said BSS when a channel of said BSS is occupied during a PLCP protocol data unit (PPDU) period; and
   transmitting a frame comprising said load information, wherein said load information further comprises fourth information representing Protocol Data Unit PDU time in relation to medium idle time in a second prescribed period, and
   wherein the determining said load information comprises:
   summing transmission time of MU uplink (UL) PHY Layer Convergence Procedure (PLCP) Protocol Data Units (PPDUs) in said second prescribed period to obtain a first transmission time; and
   summing transmission time of MU downlink (DL) PPDUs in said second prescribed period to obtain a second transmission time.

2. The method of claim 1, wherein said load information further comprises third information representing a number of MU-capable STAs in said BSS, wherein said MU-capable STAs comprise: STAs configured to perform MU Multiple-Input Multiple-Output (MU-MIMO) communications; and STAs configured to perform MU Orthogonal Frequency-Division Multiple Access (MU-OFDMA) communications.

3. The method of claim 1, wherein said determining said first information at said AP comprises monitoring activities of an STA in said BSS in said first prescribed period, and wherein further monitored activities of said STA comprise said STA transmitting a Media Access Control (MAC) Protocol Data Unit (MPDU) to said AP.

4. The method of claim 1, wherein said determining said second information comprises calculating an underutilization rate for a plurality of frequency bandwidths available for orthogonal Frequency-Division Multiple Access (OFDMA) communications, wherein said calculating comprises respectively calculating:
   an underutilization rate of a respective frequency bandwidth of said plurality of frequency bandwidths for MU DL transmissions; and an underutilization rate of said respective frequency bandwidth for MU UL transmissions.

5. The method of claim 4, wherein said underutilization rate of said respective frequency bandwidth of MU DL transmission information is determined based on a maximum number of supported spatial streams of said respective frequency bandwidth, occupied resource unit weights, RU weights of said respective frequency bandwidth, and MU DL PPDU time.

6. The method of claim 1, wherein said determining load information further comprises determining fifth information representing a number of resource units (RUs) available for a specific spatial stream size.

7. The method of claim 6, wherein said determining said fifth information comprises determining respective maximum number of RUs available for different spatial stream sizes over a frequency bandwidth.

8. The method of claim 1, wherein said determining said second information at said AP comprises
summing transmission time of Single-User (SU) downlink (DL) PPDUs in said second prescribed period to obtain a third transmission time.

9. The method of claim 8, wherein said frame comprises indications of said first transmission time, said second transmission time and said third transmission time in relation to medium idle time in said second prescribed period, respectively.

10. A wireless station comprising:
a transceiver configured to couple to a wireless network;
a processor; and
a memory coupled to said processor and storing instructions that, when executed by said processor, implement a method of:
determining load information of a Basic Service Set (BSS), wherein said load information comprises one or more of:
determining first information representing one or more of: a count of active STAs in said BSS in a first prescribed period; and a count of active MU-capable STAs in said BSS in said first prescribed period, wherein said AP received data packets from each of said active STAs or each of said active MU-capable STAs in said first prescribed period; and
determining second information representing an underutilization of resource units (RUs) usable on multiple spatial stream sizes in said BSS when a channel of said BSS is occupied during a PLCP protocol data unit (PPDU) period; and
generating a frame comprising said load information,
wherein said transceiver is further configured to transmit said frame, and
wherein said load information further comprises fourth information representing Protocol Data Unit PDU time in a second prescribed period, and wherein said fourth information indicates a ratio of accumulated DL MU PPDU time to said second prescribed period and a ratio of accumulated UL MU PPDU time to said second prescribed period.

11. The wireless station of claim 10, wherein said load information further comprises third information representing a number of MU-capable STAs in said BSS, wherein said MU-capable STAs comprise: STAs configured to perform MU Multiple-Input Multiple-Output (MU-MIMO) communications; and STAs configured to perform MU Orthogonal Frequency-Division Multiple Access (MU-OFDMA) communication.

12. The wireless station of claim 10, wherein said method further comprises monitoring activities of an STA in said BSS in said first prescribed period, wherein a monitored activity of said STA comprises said STA transmitting a Medium Access Control (MAC) Protocol Data Unit (MPDU) to said AP.

13. The wireless station of claim 10, wherein said load information further comprises a ratio of accumulated DL Single User (SU) PPDU time to said second prescribed period.

14. The wireless station of claim 10, wherein said determining said second information comprises calculating underutilization rates for a plurality of frequency bandwidths, wherein said calculating comprises respectively calculating:
an underutilization rate of a respective frequency bandwidth of said plurality of frequency bandwidth for MU DL transmissions; and
an underutilization rate of said respective frequency bandwidth for MU UL transmissions.

15. The wireless station of claim 14, wherein said underutilization rate of said respective frequency bandwidth of MU UL transmissions is determined based on a maximum number of supported spatial streams of said respective frequency bandwidth, occupied resource unit weights, RU weights of said respective frequency bandwidth, and MU UL PPDU time.

16. The wireless station of claim 10, wherein said load information further comprises fifth information representing a number of resource units (RUs) available for a specific spatial stream size.

17. A wireless station comprising:
a transceiver configured to receive a frame transmitted from an access point (AP) STA in a Basis Service Set (BSS), wherein said frame comprises load information of said BSS, wherein said load information comprises one or more of:
first information representing one or more of: a count of active STAs in said BSS in a first prescribed period; and a count of active MU-capable STAs in said BSS in said first prescribed period wherein said AP has received data packets from each of said active STAs or each of said active MU-capable STAs in said first prescribed period; and
second information representing an underutilization of resource units (RUs) usable on multiple spatial stream sizes of said BSS when a channel of said BSS is occupied during a PLCP protocol data unit (PPDU) period; and
a processor; and
a memory coupled to said processor and storing instructions that, when executed by said processor, implement a method of: processing said load information; and determining whether to associate with said BSS based on said load information,
wherein said load information further comprises fourth information representing Protocol Data Unit (PDU) time in a second prescribed period, wherein said fourth information comprises:
a ratio of DL MU PPDU time to said second prescribed period.

18. The wireless station of claim 17, wherein said determining comprises comparing said load information of said BSS with load information of another BSS.

19. The wireless station of claim 17, wherein said load information further comprises third information representing a number of MU-capable STAs in said BSS, wherein said MU-capable STAs comprise STAs configured to perform MU Multiple-Input Multiple-Output (MU-MIMO) communications and STAs configured to perform MU Orthogonal Frequency-Division Multiple Access (MU-OFDMA) communications.

20. The wireless station of claim 17, wherein said load information further comprises a ratio of UL MU PPDU time to said second prescribed period;
   and a ratio of DL Single User (SU) PPDU time to said second prescribed period.

21. The wireless station of claim 17, wherein said second information comprises one or more of:
   an underutilization percentage over a respective frequency bandwidth of said plurality of frequency bandwidths for MU DL transmission; and
   an underutilization percentage over said respective frequency bandwidth for MU UL transmission.

22. The wireless station of claim 21, wherein said underutilization rate is determined based on a maximum number of supported spatial streams of said respective frequency bandwidth, occupied resource unit weights, RU weights of said respective frequency bandwidth, and MU DL PPDU time.

23. The wireless station of claim 17, wherein said load information further comprises fifth information representing a number of resource units (RUs) available for a specific spatial stream size.

* * * * *